United States Patent [19]

Slat et al.

[11] Patent Number: 4,909,723

[45] Date of Patent: Mar. 20, 1990

[54] MULTIPLE CAVITY IN-MOLD LABEL DISPENSER FOR PLASTIC BLOW MOLDING MACHINE

[75] Inventors: William A. Slat, Brooklyn, Mich.; Richard L. Dunlap, Cairo, Ohio

[73] Assignee: Plastipak Packaging, Inc., Plymouth, Mich.

[21] Appl. No.: 272,242

[22] Filed: Nov. 16, 1988

[51] Int. Cl.[4] .............................................. B29C 49/24
[52] U.S. Cl. .................................... 425/503; 264/509; 425/126.1; 425/504
[58] Field of Search ..................... 425/126.1, 503, 504; 264/509

[56] References Cited

U.S. PATENT DOCUMENTS

| | | | |
|---|---|---|---|
| 3,292,209 | 12/1966 | Borkmann | 425/126.1 |
| 3,324,508 | 6/1967 | Dickinson | 425/126.1 |
| 4,355,967 | 10/1982 | Hellmer | 425/503 |
| 4,359,314 | 11/1982 | Hellmer | 425/503 |
| 4,397,625 | 8/1983 | Hellmer et al. | 425/135 |
| 4,479,644 | 10/1984 | Bartimes et al. | 425/503 |
| 4,479,770 | 10/1984 | Slat et al. | 425/503 |
| 4,479,771 | 10/1984 | Slat et al. | 425/503 |
| 4,498,854 | 2/1985 | Ross | 425/126.1 |
| 4,582,474 | 4/1986 | Ziegler | 425/503 |
| 4,585,408 | 4/1986 | Darr | 425/503 |
| 4,639,206 | 1/1987 | Darr | 425/503 |
| 4,639,207 | 1/1987 | Slat et al. | 425/503 |
| 4,721,451 | 1/1988 | Darr | 425/503 |
| 4,737,099 | 4/1988 | Kaminski | 425/504 |

*Primary Examiner*—Jay H. Woo
*Assistant Examiner*—Timothy W. Heitbrink
*Attorney, Agent, or Firm*—Brooks & Kushman

[57] ABSTRACT

An in-mold label dispenser (20) for use with a multiple cavity mold (28) of a plastic blow molding machine (22) includes dispensing heads (54) adjustably supported on a movable shuttle (52) to permit adjustment of the location of label positioning within the molds. An adjustable support assembly (58) supports the dispensing heads (54) with respect to each other, and a drive mechanism (70) drives the shuttle and label carriers (56) of the dispensing heads to provide the in-mold labeling operation. The drive mechanism (70) includes first and second drives (80,84) that respectively drive the shuttle (52) and the label carriers (56).

10 Claims, 6 Drawing Sheets

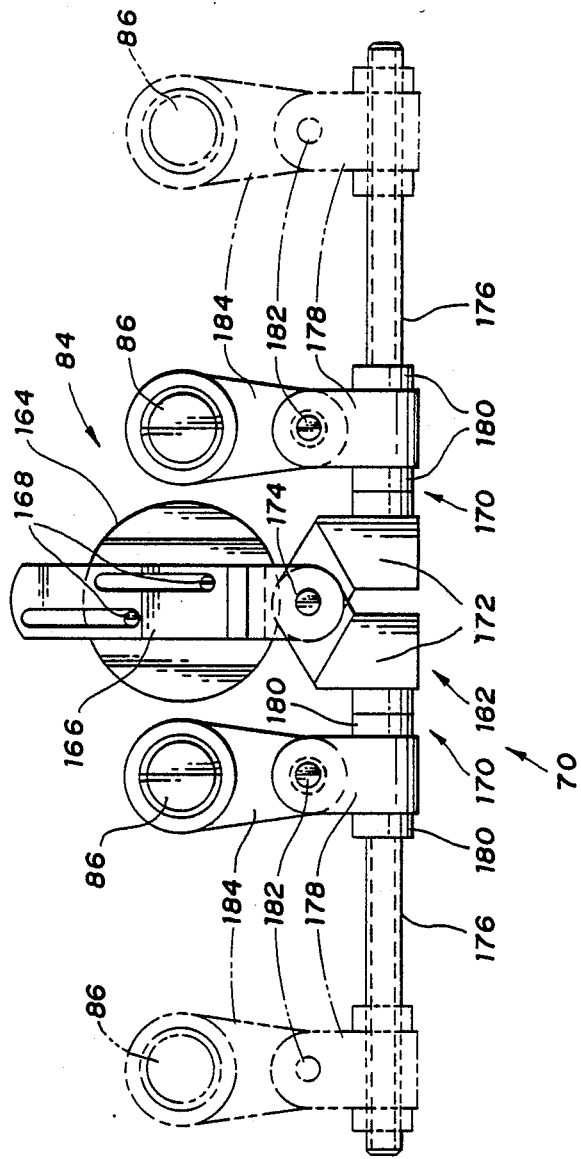

MULTIPLE CAVITY IN-MOLD LABEL DISPENSER FOR PLASTIC BLOW MOLDING MACHINE

TECHNICAL FIELD

This invention relates to a multiple cavity in-mold label dispenser for use with a plastic blow molding machine.

BACKGROUND ART

Blow molding machines conventionally provide a parison, i.e. a tube of hot plastic, between open sections of a mold. Closing of the mold then clamps the parison and allows air to be blown into the parison such that is assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the parison and by then closing sections of the mold in preparation for the blowing operation. The subsequent blowing operation forms the parison around the label to the shape of the mold and provides a permanent bond which is incapable of being broken by moisture or otherwise. Also, such in-mold labeling provides a smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated or other beverages, it is believed that in-mold labeling reduces the flow of carbon dioxide and other fluids through the container wall over a period of time and thereby increases the shelf life.

Prior in-mold label dispensers for blow molding machines conventionally include a label carrier having a vacuum cup that receives a label from a label magazine and is then moved to deposit the label within the mold cavity whereupon termination of a vacuum drawn at the vacuum cup allows a vacuum drawn at the mold cavity to secure the label in position in preparation for the blow molding. Such vacuum type label carriers have previously been mounted on linkages that move the labels along an angular path with respect to the direction of opening and closing movement of mold sections of the mold in order to permit depositing of the labels in the confined space permitted by the extent of the mold opening. With the linkage type of label carrier, only one label can be deposited within the mold at a give time since movement of the linkage toward one mold section interferes with movement of a similar linkage toward an opposed mold section for depositing another label.

Another prior art type of in-mold label dispenser is disclosed by U.S. Pat. Nos. 4,355,967 and 4,359,314 and includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit labels on both mold sections of the mold at a given time due to the limited space present upon opening of the mold.

U.S. Pat. Nos. 3,292,209, 4,397,625 and 4,498,854 disclose in-mold label dispensers wherein fluid motors move label carriages and/or label carriers on the carriages to transfer labels from label stacks into associated molds. The in-mold label dispenser of the mentioned U.S. Pat. No. 3,292,209 is capable of labeling a dual cavity mold that permits increased output without requiring a faster cycle time.

U.S. Pat. No. 3,324,508 discloses an in-mold label dispenser wherein a linkage moves labels from rolls of labels to a mold where the labels are held by an electrostatic charge prior to the blow molding operation.

U.S. Pat. Nos. 4,479,770, 4,479,771 and 4,639,207 of William A. Slat, et al. disclose in-mold label dispensers wherein a first solid mechanical drive moves a dispensing head between inserted and withdrawn positions with respect to an open mold and wherein a second solid mechanical drive extends and retracts label carriers in order to perform the labeling operation. Use of such solid mechanical drives to move the dispensing head and the label carriers permits accurate positioning of the labels.

U.S. Pat. No. 4,479,644 discloses another type of in-mold label dispenser for use with a plastic blow molding machine.

U.S. Pat. No. 4,582,474 of William E. Ziegler discloses an in-mold label dispenser with different embodiments capable of providing labels to single, dual, and three cavity molds. In certain applications, multiple cavity molds are desirable to increase production from the blow molding machine while still maintaining the same cycle time such that quality can be maintained. The in-mold label dispenser that provides labeling of single, dual, and three cavity machines in accordance with the U.S. Pat. No. 4,582,474 has a carrier arm with a first end pivotally supported on a base of the dispenser for movement about a pivotal axis to move a dispensing head on a second end of the carrier arm along a curved path between withdrawn and inserted positions with respect to the mold. A drive mechanism of the dispenser includes a first drive that pivotally moves the carrier arm between the withdrawn and inserted positions and also includes a second drive that moves a label carrier on the dispensing head between the retracted and extended positions during cyclical operation that provides the in-mold labeling.

U.S. Pat. Nos. 4,585,408, 4,639,206, and 4,721,451 of Richard C. Darr disclose in-mold label dispensers for plastic blow molding wherein a dispensing head is moved with rectilinear motion between withdrawn and inserted positions with respect to the mold and is moved transverse to the direction of the rectilinear motion between an aligned position with respect to the open mold and a label transfer position. The in-mold label dispenser of U.S. Pat. No. 4,585,408 has an elongated support that mounts the dispensing head for the rectilinear movement and is itself mounted about a pivotal axis to support the dispensing head for pivotal movement between the aligned and transfer positions. In the in-mold label dispenser of U.S. Pat. No. 4,639,206, a pair of locators mounted by base portions on opposite sides of the mold are engaged with each other as the dispensing head is moved to its inserted position to thereby provide support in locating the dispensing head prior to arcuate movement to the label transfer position for dispensing of labels. With both of these dispensers, the arcuate movement of the dispensing head between its mold aligned and transfer positions does not permit labeling of certain mold constructions since the degree to which the dispensing head can move arcuately is limited by the mold construction and the construction of cavity sections within the mold. In the in-mold label dispenser of U.S. Pat. No. 4,721,451, the dispensing head is moved rectilinearly between the aligned and transfer positions in a transverse direction to the rectilinear movement between the withdrawn and inserted positions.

DISCLOSURE OF INVENTION

An object of the present invention is to provide an in-mold label dispenser capable of being utilized with multiple cavity molds and being adjustable so as to permit labeling of differently spaced cavities on different molds when the machine is converted from one blow molding job to another.

In carrying out the above object and other objects of the invention, the in-mold label dispenser is designed for use with a plastic blow molding machine having a multiple cavity mold including mold sections movable between open and closed positions. Each mold section of the mold includes at least two cavity sections such that the closed mold sections cooperatively define at least two enclosed cavities for blow molding multiple pieces. The in-mold label dispenser of the invention includes a base and also includes a shuttle having a pair of dispensing heads each of which includes at least one label carrier movable thereon between retracted and extended positions. The shuttle is movable with respect to the base between a withdrawn position with respect to the mold and an inserted position between the open mold sections. An adjustable support assembly of the shuttle adjustably mounts the pair of dispensing heads with respect to each other to provide the adjustment for different spacing of the mold cavities. A label supply of the dispenser provides labels to the label carriers of the dispensing heads with the shuttle in the withdrawn position. A drive mechanism of the dispenser drives the shuttle and the label carriers of the dispensing heads in coordination with the opening and closing of the mold sections to provide labels to the cavity sections of the mold prior to the blow molding.

In the preferred construction of the in-mold label dispenser, the support assembly includes a pair of support members and a first pair of elongated adjusters for respectively mounting the pair of support members on the shuttle for adjustment along a first direction. A second pair of elongated adjusters in this preferred construction respectively mounts the pair of dispensing heads on the pair of support members for adjustment along a second direction transverse to the first direction.

The preferred construction of the drive mechanism of the in-mold label dispenser includes a first drive having a drive linkage that extends between the base and the shuttle to drive the shuttle between the withdrawn and inserted positions. A second drive of the drive mechanism includes a pair of rotatable drive shafts that drive the label carriers between the retracted and extended positions with a pair of bearings respectively supporting the pair of drive shafts for rotation. The base of the in-mold label dispenser includes a main base portion and also includes a pair of movable base portions on which the pair of bearing are respectively mounted. A third pair of elongated adjusters support the pair of movable base portions on the main base portion for adjustment along one of the directions of adjustment between the support members and the shuttle and between the dispensing heads and the support members. Each dispensing head has an elongated slidable connection with one of the shafts to permit adjustment of the dispensing heads along the other direction of adjustment. Each pair of elongated adjusters is preferably embodied by a pair of rectilinear slideways that are adjustable to provide each of the mentioned modes of adjustment.

In its preferred construction, the in-mold label dispenser has the second drive provided with an adjustable drive linkage that rotates the pair of drive shafts in coordination with each other. This adjustable drive linkage of the second drive preferably includes a rotatable drive member supported for rotation on the main base portion of the base, a drive link having an adjustable slot and pin connection to the rotatable drive member, and a pair of adjustable pivotal linkages that respectively connect the drive link to the pair of drive shafts. The third pair of elongated adjusters mounts the pair of movable base portions on the main base portion in a spaced relationship with the rotatable drive member of the second drive located between the pair of movable base portions. The drive link and adjustable pivotal linkages of the second drive permit adjustment of the movable base portions and the drive shafts supported thereby upon adjustment of the pair of dispensing heads.

The objects, features, and advantages of the present invention are readily apparent from the following detailed description of the best mode for carrying out the invention when taken in connection with the accompanying drawings.

BRIEF DESCRIPTION OF DRAWINGS

FIG. 8 is a view of the in-mold label dispenser taken generally along the direction of line 8—8 in FIG. 5 to illustrate the drive mechanism construction for providing driving of the label carriers of the dispenser.

BEST MODE FOR CARRYING OUT THE INVENTION

Figure 1:
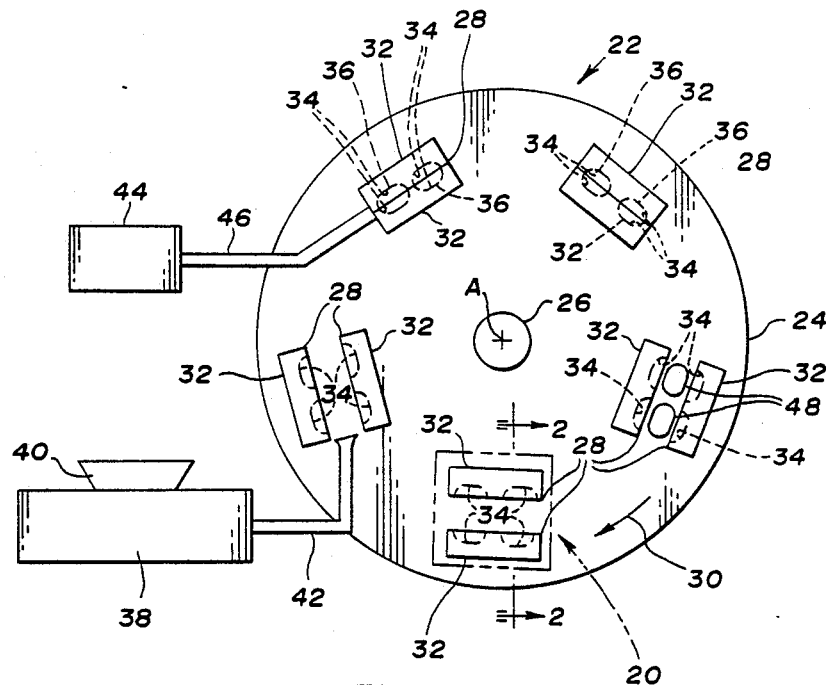
FIG. 1 is a schematic, elevational view of a plastic blow molding machine and an in-mold label dispenser that is constructed in accordance with the present invention and shown in phantom line representation.

With reference to FIG. 1 of the drawings, an in-mold label dispenser constructed in accordance with the present invention is schematically illustrated and identified by reference numeral 20. In-mold label dispenser 20 is utilized with a plastic blow molding machine 22 that includes a rotary wheel 24 mounted by a shaft 26 for rotation about an axis A. Rotary wheel 24 includes dual cavity molds 28 mounted on its periphery for movement in a clockwise direction as illustrated by arrow 30. Each mold 28 includes a pair of mold sections 32 that are mounted on the wheel 24 for movement between open and closed positions with respect to each other as shown in FIG. 1. Mold sections 32 each include a pair of cavity sections 34 that cooperate with the cavity sections of the associated mold section to define a pair of enclosed cavities 36 in the closed position of the mold. Downstream from the in-mold label dispenser 20, the blow molding machine 22 includes an extruder 38 whose input receives raw plastic from a hopper 40 and whose output 42 feeds an extruded plastic tubular parison to each cavity of the adjacent open mold 28 which has previously had one or more labels supplied to at least one cavity section of each cavity by the label dispenser 20. Rotation of the wheel 24 and closing of the mold with each extruded plastic parison received within the associated cavity is then followed by a blowing operation during which a source of compressed gas 44 feeds a conduit 46 that is communicated with the interior of each extruded plastic parison within the mold cavities 36 of the adjacent mold. Outward blowing of each extruded plastic parison to the shape of the associated mold cavity 36 then provides securement of the blown plastic to the label within the mold cavity to complete the in-mold labeling operation. During continued rotation of the machine wheel 24, cooling takes place prior to opening of the mold 28 to permit ejection of the labeled blow molded articles 48. The open mold is then moved by subsequent rotation of wheel 24 to the in-mold label dispenser 20 in preparation for another cycle of the in-mold labeling operation.

Figure 2:
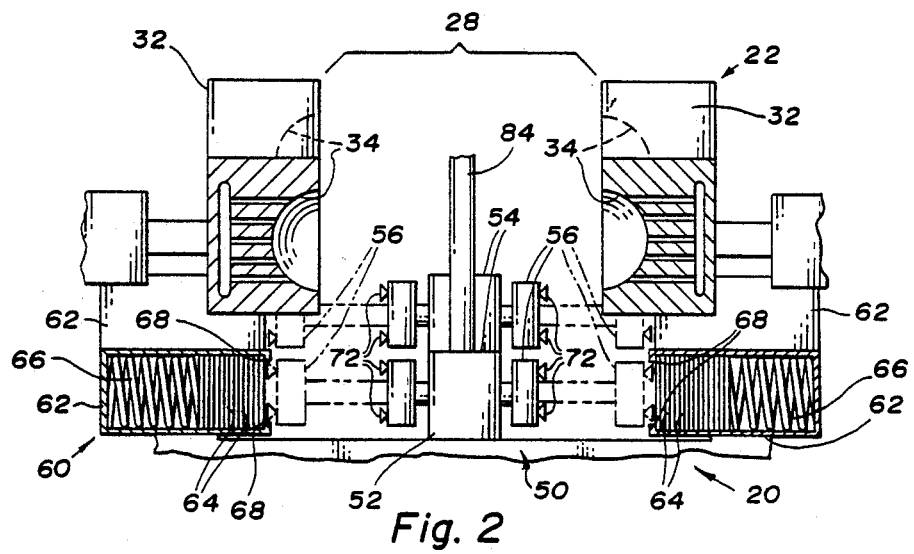
FIG. 2 is a partially sectioned view taken along the direction of line 2—2 in FIG. 1 to illustrate the construction of the in-mold label dispenser and is shown with a shuttle thereof in a withdrawn position with respect to open mold sections of a multiple cavity mold of the blow molding machine.
Figure 3:
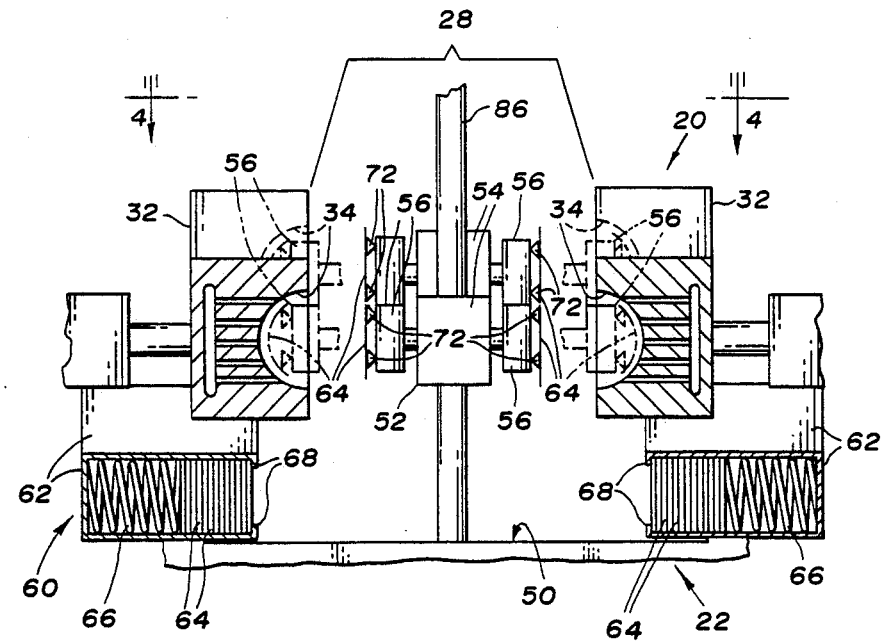
FIG. 3 is a partially sectioned view similar to FIG. 2 but shown with the shuttle in an inserted position with respect to the open mold.
Figure 4:
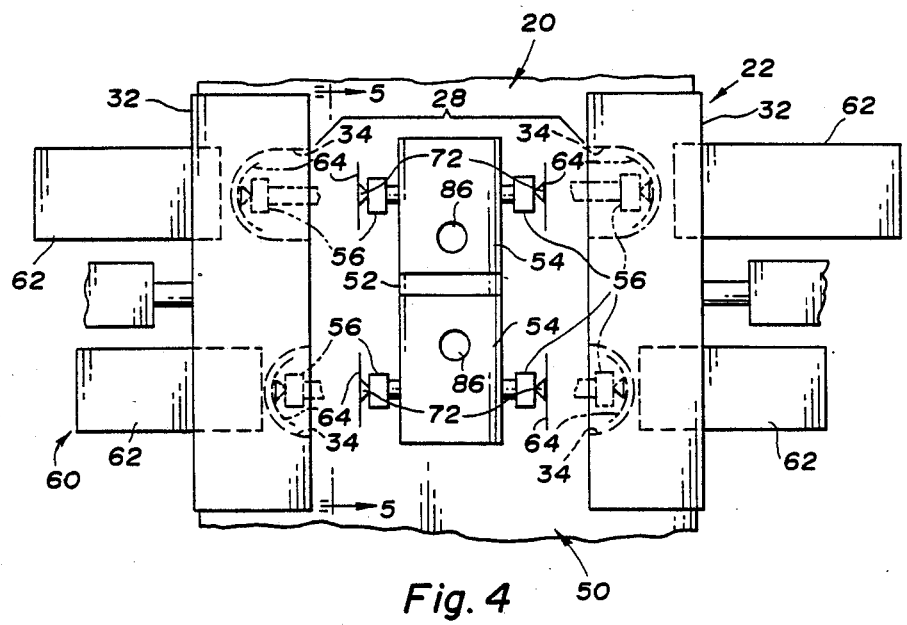
FIG. 4 is a view of the in-mold label dispenser taken along the direction of line 4—4 in FIG. 3.

As shown by combined reference to FIGS. 2-6, the in-mold label dispenser 20 includes a base 50 that is mounted in a fixed relationship such that the molds 28 move by the dispenser while in the open condition illustrated in FIGS. 2-4. Dispenser 20 also includes a shuttle 52 having a pair of dispensing heads 54 each of which includes at least one label carrier 56 movable thereon between retracted and extended positions as respectively shown by solid and phantom line representation in FIGS. 2-4. The shuttle 52 is movable with respect to the fixed base 50 between a withdrawn position with respect to the mold 28 as shown in FIG. 2 and an inserted position between the open mold sections 32 as shown in FIG. 3. Shuttle 52 also includes an adjustable support assembly generally identified by 58 in FIGS. 5 and 6 for adjustably mounting the pair of dispensing heads 54 with respect to each other as is hereinafter more fully described. A label supply 60 of the dispenser is illustrated as being embodied by a plurality of label magazines 62 each of which supports a stack of labels 64 that are biased by a spring 66 against fingers 68 that control the release of labels for transfer to the molds as is hereinafter more fully described. A drive mechanism 70 of the dispenser is illustrated by FIGS. 5-8 and provides driving of the shuttle 52 and the label carriers 56 of the dispensing heads 54 in coordination with the opening and closings of the mold sections 32 to provide labels to the cavity sections of the mold prior to the blow molding operation.

A cycle of operation of the label dispenser 20 begins with the shuttle 52 in the withdrawn position as shown by solid line representation in FIG. 2. The drive mechanism of the label dispenser then initially extends the label carriers 56 to the phantom line indicated position to receive a label therefrom for securement by vacuum cups 72 of the label carriers, whereupon the label carriers are driven back to the retracted position. Driven movement of shuttle 52 to the inserted position shown in FIG. 3 and extending movement of the label carriers 56 to the phantom line positions then deposits the labels 64 within the cavity sections 34 of the mold prior to retracting movement of the label carriers and movement of the shuttle 52 back to the withdrawn position in preparation for the next cycle.

As is hereinafter more fully described, the in-mold label dispenser 20 advantageously is adjustable to accommodate for molds 28 whose cavity sections 34 are spaced differently from each other. This adjustment thus facilitates use of the in-mold label dispenser 20 with different production jobs in order to thereby produce a more economical product. Also, the manner in which this adjustment is accomplished and the coordination of the in-mold labeling with opening and closing of the molds insures accurate label registration after the adjustment has been made.

Figure 5:
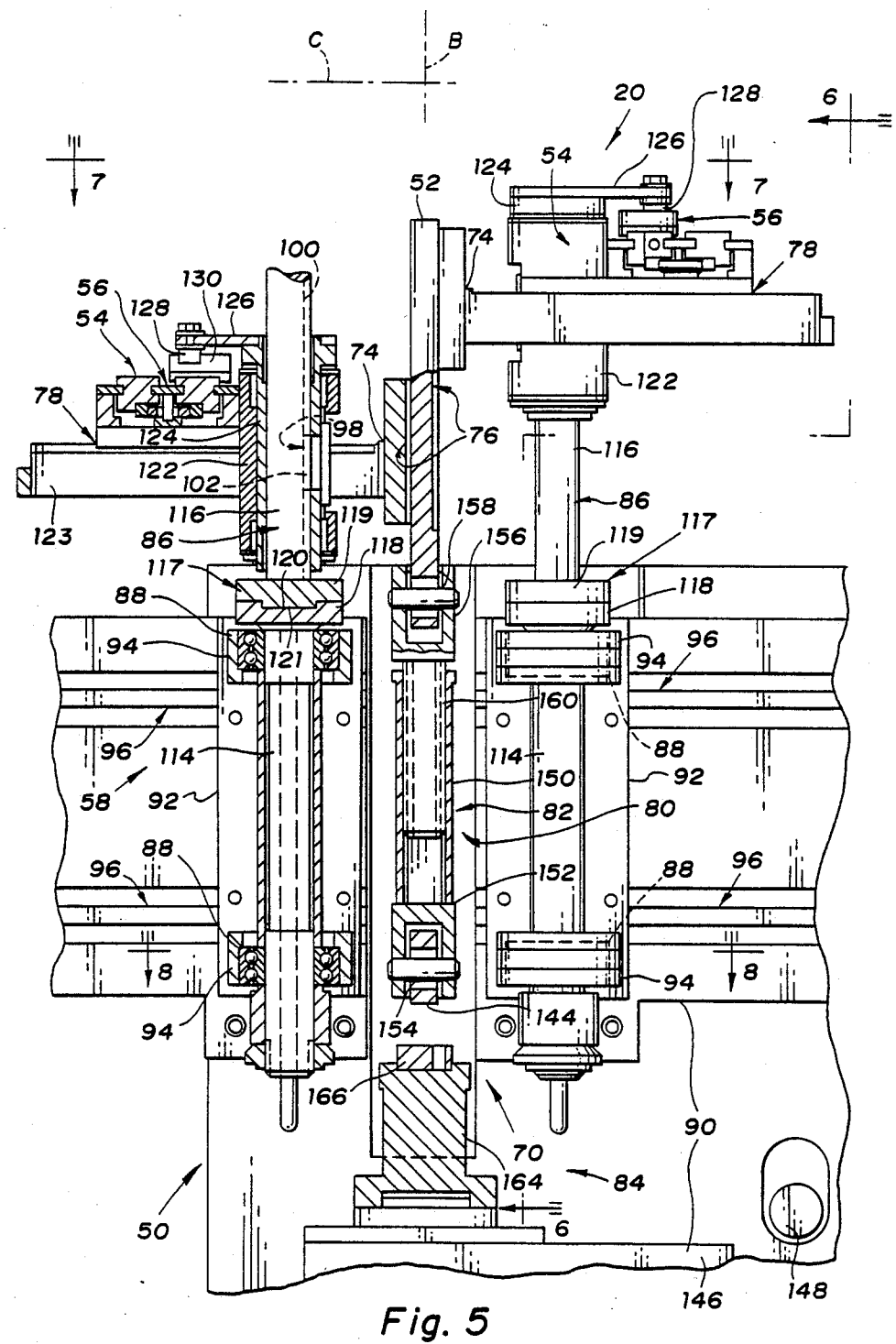
FIG. 5 is a partially sectioned view of the in-mold label dispenser taken generally along the direction of line 5—5 in FIG. 4.
Figure 7:
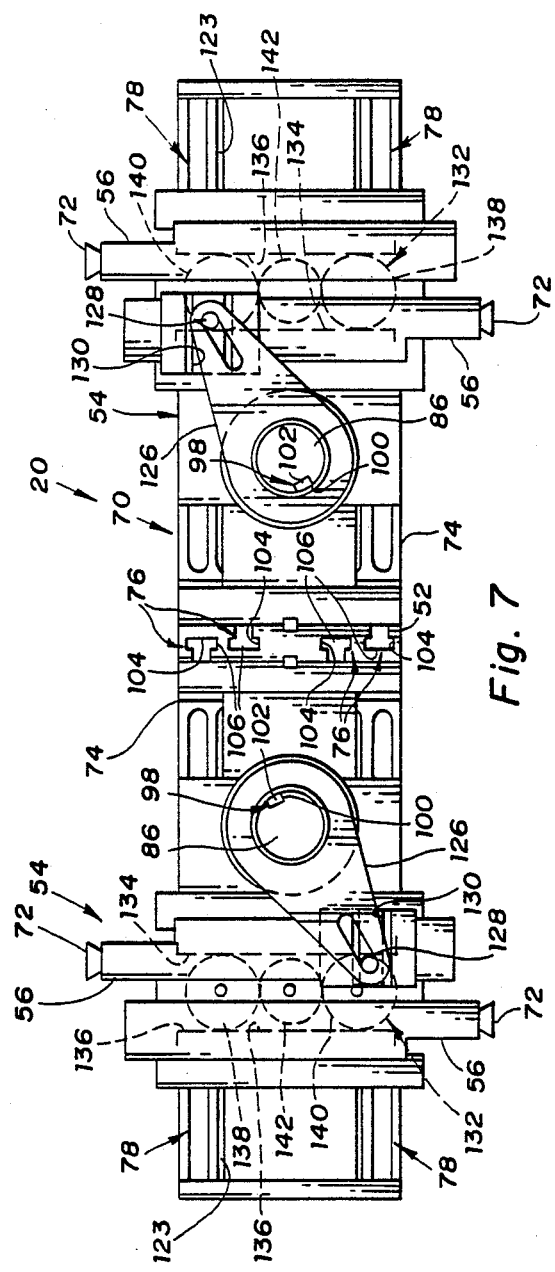
FIG. 7 is a plan view of the in-mold label dispenser taken along the direction of line 7—7 in FIG. 5 to illustrate the drive mechanism construction for driving label carriers of a pair of dispensing heads of the dispenser.

As best illustrated in FIGS. 5 and 7, the dispensing head support assembly 58 of the label dispenser preferably includes a pair of support members 74 and a first pair of elongated adjusters 76 for respectively mounting the pair of support members on the shuttle 52 for adjustment along a first direction B. A second pair of elongated adjusters 78 respectively mount the pair of dispensing heads 54 on the pair of support members 74 for adjustment along a second direction C transverse to the first direction B. This adjustment in the transverse directions B and C is parallel to the plane of the interface between the opening and closing mold sections 32 so as to permit placement of labels in any position within the mold cavity sections 34.

Figure 6:
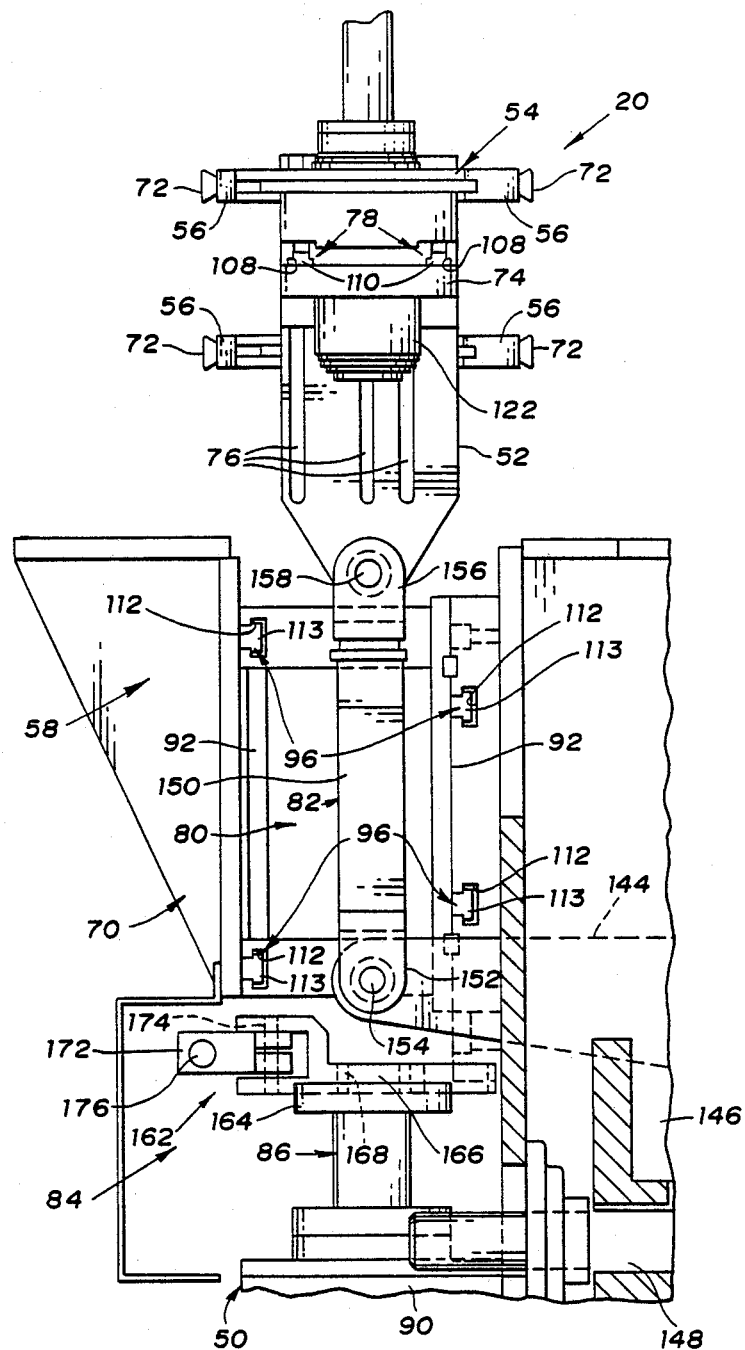
FIG. 6 is a partially sectioned view of the in-mold label dispenser taken generally along the direction of line 6—6 in FIG. 5.

In the preferred construction of the label dispenser 20, the drive mechanism 70 as shown in FIGS. 5 and 6 includes a first drive 80 having a drive linkage 82 that extends between the base 50 and the shuttle 52 to drive the shuttle between the withdrawn and inserted positions in coordination with the opening and closing of the molds. The drive mechanism 70 also includes a second drive 84 shown in FIG. 8 as having a pair of rotatable shafts 86 that drive the label carriers 56 between the retracted and extended positions upon driven rotation as is hereinafter more fully described. A pair of bearings 88 respectively support the pair of shafts 86 for such rotation, with each shaft preferably being supported as shown in FIG. 5 by a pair of such bearings 88 which are of the anti-friction type including inner and outer races supported for rotation with respect to each other by roller elements that are illustrated as being of the ball type in double rows.

As illustrated best by continuing reference to FIG. 5, the base 50 of the in-mold label dispenser is disclosed as including a main base portion 90 and a pair of movable base portions 92 on which each bearing 88 is supported by an associated annular mount 94 with its outer race being held stationary and with its inner race supporting the associated shaft 86 for rotation. A third pair of elongated adjusters 96 support the pair of movable base portions 92 on the main base portion 90 for adjustment along one of the directions, specifically the direction C illustrated in FIG. 5 along which the dispensing heads are supported for adjustment toward and away from each other by the second pair of adjusters 78. Each label carrier 56 has an elongated slidable connection 98 to one of the shafts 86 to permit adjustment of the dispensing heads 54 along the other direction B as well as permitting movement of the shuttle 52 between the withdrawn and inserted positions while maintaining the connection between the shafts and the label carriers. Each of these connections 98 includes an elongated slot 100 in the shaft 86 and a key 102 that is slidably received within the length of the shaft slot and fixed to the associated label carrier 56 to provide rotation thereof as the shaft rotates as is hereinafter more fully described.

In the preferred construction of the in-mold label dispenser 20, each of the pair of elongated adjusters 76, 78, and 96 is embodied by a pair of rectilinear slideways that are adjustable. More specifically, the first pair of elongated adjusters 76 as illustrated best in FIG. 7 is each embodied by a pair of rectilinear slideways that are each provided with a way 104 and T slot type slide 106 received by the way so as to be adjustable with the location of adjustment being fixed by one or more unshown lock bolts. Likewise, each of the second pair of elongated adjusters 78 is also embodied by a pair of rectilinear slideways each of which as shown in FIG. 6 includes a way 108 in the associated support member 74 and each of which also includes a T slot type slide 110 that is located on the associated dispensing head 54 and received within the way to provide adjustment along the direction C of FIG. 5 with one or more unshown lock bolts fixing the location of adjustment.

Similarly, the third pair of elongated adjusters 96 each includes a pair of rectilinear slideways embodied as shown in FIG. 6 by a way 112 and a T slot type slide 113 that is received within the way 112 to provide support of the associated movable base portion 92 on the main base portion 90 in order to permit the adjustment along the direction C of FIG. 5 as the dispensing heads are moved toward or away from each other with the location of each adjuster 96 being fixed by one or more unshown lock bolts.

As illustrated best in FIG. 5, each shaft 86 has a lower portion 114 mounted by the associated bearings 88 and also has an upper portion 116 in which its slot 100 is provided extending along the axis of shaft rotation. A coupling 117 of each shaft 86 has a lower portion 118 fixed to the lower shaft portion 114 and has an upper portion 119 fixed to the upper shaft portion 116. Lower and upper coupling portions 118 and 119 respectively have a hole 120 and a projection 121 that are axially engaged with each other along the direction of shaft rotation and shaped to rotatively fix the upper and lower shaft portions 114 and 116 for rotation with each other while permitting axial disengagement therebetween for removal of the dispensing heads when necessary. Suitable unshown fasteners secure the coupling portions 118 and 119 to each other to fix the shaft portions during use.

As illustrated in FIG. 5, each dispensing head 54 includes a journal type bearing 122 that projects downwardly through an elongated opening 123 in the associated support member and receives a bearing sleeve 124 of a cam member 126 which has an outer end supporting a cam 128 that is received within a cam slot 130 of an adjacent label carrier 56. As illustrated, the label dispenser 20 provides a label to both cavity sections 34 of each mold section 32 as shown in FIG. 4 such that the label carriers 56 are arranged in pairs as shown in FIG. 7 with each cam member 126 being rotated by rotation of the associated shaft 86 so as to thereby directly move one of its label carriers 56. A gear drive train 132 of each dispensing head 54 is meshed with a rack 134 on the one label carrier 56 as well as being meshed with a rack 136 on the associated label carrier 56. More specifically, the gear drive train 132 includes a pair of large end gears 138 and 140 which are both meshed with a smaller middle gear 142 that maintains a driving relationship of the other label carrier 56 not directly driven by the cam member 126 even when the label carriers are positioned in their extended positions such that rack 134 meshes only with end gear 138 and rack 136 meshes only with end gear 140.

As illustrated in FIGS. 5 and 6, the drive linkage 82 of the first drive 80 is located between the pair of movable base portions 92 and includes a link 144 that is pivotally driven by a gear box 146 whose input 148 is driven in coordination with the rotation of the machine wheel 24 shown in FIG. 1 so as to operate in coordination with the opening and closing of the machine molds. Linkage 82 also includes an adjustable link 150 having a lower clevised end 152 with a pivotal connection 154 to the link 144. Adjustable link 150 also has an upper clevised end 156 with a pivotal connection 158 to the shuttle 52. Between its lower and upper ends 152 and 156, adjustable link 150 has a threaded adjuster 160 (FIG. 5) for adjusting the distance between its ends 152 and 156 in order to adjustably control the positioning of the shuttle 52.

As illustrated best in FIGS. 5, 6, and 8, the second drive 84 of the drive mechanism 70 preferably includes an adjustable drive linkage 162 that rotates the pair of drive shafts 86 in coordination with each other. This adjustable drive linkage 162 includes a rotatable drive member 164 that is supported for rotation on the main base portion 90 and driven by the gear box 146 whose input 148 as previously mentioned is driven by the rotation of the machine wheel 24 so as to provide driving in coordination with the opening and closing of the mold. Thus, adjustable drive linkage 162 of the second drive is driven in coordination with the drive linkage 82 of the first drive that drives the shuttle so as to coordinate the shuttle driving and the rotational driving of the shafts 86 that move the label carriers 56 as previously described.

Adjustable drive linkage 162 also includes a drive link 166 having an adjustable slot and pin connection 168 to the drive member 164, wherein each pin of the connection is a threaded bolt that can be tightened to secure the adjusted position that permits the correct amount of movement. Adjustable drive linkage 162 as shown in FIG. 8 also includes a pair of adjustable pivotal linkages 170 that respectively connect the drive link 164 to the pair of drive shafts 86. Each of these pivotal linkages 170 includes a link 172 pivotally connected by a common pivotal connection 174 to the drive link 166 along with the other link 172. Each of the links 172 includes a threaded connecting rod 176 fixed thereto and extending through an apertured link 178 with a pair of nuts 180 fixing the location of securement along the rod. A pivotal connection 182 secures the link 178 to a link 184 that is rotatively fixed to the adjacent shaft 86 to provide shaft rotation as the drive member 164 is rotated. During adjustment of the location of the shafts as the dispensing heads are adjusted, the pivotal linkages 170 are also adjusted by loosening nuts 180 to permit adjustment of the links 178 along the associated rods 176 prior to subsequent tightening of the nuts 180 after the adjustment is completed to another position such as shown by phantom line representation.

As illustrated in FIG. 5, the pair of elongated adjusters 96 mounts the pair of movable base portions 92 on the main base portion 90 with the drive linkage 82 of the first drive 80 located therebetween along with the drive member 164 of the second drive 84. The link 166 supported on the upper end of the drive member 164 and the adjustable pivotal linkages 170 of the second drive shown in FIG. 8 permit adjustment of the movable base portions 92 shown in FIG. 5 along with the drive shafts 86 supported thereby upon adjustment of the pair of dispensing heads as previously described.

It should be appreciated that, while the in-mold label dispenser 20 has been shown with a two cavity mold, it is also possible for the dispenser to be constructed for use with molds having three, four or more cavities with the adjustment described permitting movement of the dispensing heads thereof with respect to each other.

While the best mode for carrying out the invention has been described in detail, those familiar with the art to which this invention relates will recognize various alternative designs and embodiments for practicing the invention as defined by the following claims.

What is claimed is:

1. An in-mold label dispenser for use with a plastic blow molding machine, said machine having a multiple cavity mold including mold sections movable between open and closed positions, with each mold section including at least two cavity sections such that the closed mold sections cooperatively define at least two enclosed cavities for blow molding multiple pieces, and the closed mold sections having a plane of interface with each other, the in-mold label dispenser comprising: a base; a shuttle including a pair of dispensing heads each of which includes at least one label carrier movable thereon between retracted and extended positions; the shuttle being movable with respect to the base between a withdrawn position with respect to the mold and an inserted position between the open mold sections; the shuttle including an adjustable support assembly means for adjustably mounting the pair of dispensing heads with respect to each other along first and second directions that are transverse to each other and parallel to the plane of interface of the closed mold sections; a label supply for providing labels to the label carriers of the dispensing heads with the shuttle in the withdrawn position; and a drive mechanism for driving the shuttle and the label carriers of the dispensing heads in coordination with the opening and closing of the mold sections to provide labels to the cavity sections of the mold prior to the blow molding.

2. An in-mold label dispenser for use with a plastic blow molding machine, said machine having a multiple cavity mold including mold sections movable between open and closed positions, with each mold section including at least two cavity sections such that the closed mold sections cooperatively define at least two enclosed cavities for blow molding multiple pieces, the in-mold label dispenser comprising: a base; a shuttle including a pair of dispensing heads each of which includes at least one label carrier movable thereon between retracted and extended positions; the shuttle being movable with respect to the base between a withdrawn position with respect to the mold and an inserted position between the open mold sections; the shuttle including an adjustable support assembly including a pair of support members and a first pair of elongated adjusters for respectively mounting the pair of support members on the shuttle for adjustment along a first direction; the adjustable support assembly also including a second pair of elongated adjusters for respectively mounting the pair of dispensing heads on the pair of support members for adjustment along a second direction transverse to the first direction such that the support assembly adjustably mounts the pair of dispensing heads with respect to each other along the first and second directions; a label supply for providing labels to the label carriers of the dispensing heads with the shuttle in the withdrawn position; and a drive mechanism for driving the shuttle and the label carriers of the dispensing heads in coordination with the opening and closing of the mold sections to provide labels to the cavity sections of the mold prior to the blow molding.

3. An in-mold label dispenser as in claim 2 wherein the drive mechanism includes a first drive having a drive linkage that extends between the base and the shuttle to drive the shuttle between the withdrawn and inserted positions, the drive mechanism also including a second drive having a pair of rotatable drive shafts that drive the label carriers between the retracted and extended positions, a pair of bearings that respectively support the pair of drive shafts for rotation, the base including a main base portion and also including a pair of movable base portions on which the pair of bearings are respectively mounted, a third pair of elongated adjusters that support the pair of movable base portions on the main base portion to permit adjustment along one of the directions, and each dispensing head having an elongated slidable connection to one of the shafts to permit adjustment of the dispensing heads along the other direction.

4. An in-mold label dispenser as in claim 3 wherein each pair of elongated adjusters is embodied by a pair of rectilinear slideways that are adjustable.

5. An in-mold label dispenser as in claim 3 or 4 wherein the second drive includes an adjustable drive linkage that rotates the pair of drive shafts in coordination with each other.

6. An in-mold label dispenser as in claim 5 wherein the adjustable drive linkage of the second drive includes: a rotatable drive member supported for rotation on the main base portion of the base; a drive link having an adjustable slot and pin connection to the rotatable drive member; and a pair of adjustable pivotal linkages that respectively connect the drive link to the pair of drive shafts.

7. An in-mold label dispenser as in claim 6 wherein the third pair of elongated adjusters mounts the pair of movable base portions on the main base portion in a spaced relationship with the rotatable drive member of the second drive located therebetween, and the link and adjustable pivotal linkages of the second drive permitting adjustment of the movable base portions and the drive shafts supported thereby upon adjustment of the pair of dispensing heads.

8. An in-mold label dispenser for use with a plastic blow molding machine, said machine having a multiple cavity mold including mold sections movable between open and closed positions, with each mold section including at least two cavity sections such that the closed mold sections cooperatively define at least two enclosed cavities for blow molding multiple pieces, the in-mold label dispenser comprising: a base; a shuttle including a pair of dispensing heads each of which includes at least one label carrier movable thereon between retracted and extended positions; the shuttle being movable with respect to the base between a withdrawn position with respect to the mold and an inserted position between the open mold sections; the shuttle including an adjustable support assembly having a pair of support members and a first pair of elongated adjusters for respectively mounting the pair of support members on the shuttle for adjustment along a first direction; the support assembly also having a second pair of elongated adjusters for respectively mounting the pair of dispensing heads on the pair of support members for adjustment along a second direction transverse to the first direction to thereby adjustably mount the pair of dispensing heads with respect to each other; a label supply for providing labels to the label carriers of the dispensing heads with the shuttle in the withdrawn position; and a drive mechanism for driving the shuttle and the label carriers of the dispensing heads in coordination with the opening and closing of the mold sections to provide labels to the cavity sections of the mold prior to the blow molding.

9. An in-mold label dispenser for use with a plastic blow molding machine, said machine having a multiple cavity mold including mold sections movable between open and closed positions, with each mold section including at least two cavity sections such that the closed mold sections cooperatively define at least two enclosed cavities for blow molding multiple pieces, the in-mold label dispenser comprising: a base including a main base portion and a par of movable base portions; a shuttle including a pair of dispensing heads each of which includes at least one label carrier movable thereon between retracted and extended positions; the shuttle being movable with respect to the base between a withdrawn position with respect to the mold and an inserted position between the open mold sections; the shuttle including an adjustable support assembly having a pair of support members and a first pair of elongated rectilinear slideway adjusters for respectively mounting the pair of support members on the shuttle for adjustment along a first direction; the support assembly also having a second pair of elongated rectilinear slideway adjusters for respectively mounting the pair of dispensing heads on the pair of support members for adjustment along a second direction transverse to the first direction to thereby adjustably mount the pair of dispensing heads with respect to each other; a label supply for providing labels to the label carriers of the dispensing heads with the shuttle in the withdrawn position; a drive mechanism including a first drive having a drive linkage that extends between the base and the shuttle to drive the shuttle between the withdrawn and inserted positions; the drive mechanism also including a second drive having a pair of rotatable drive shafts that drive the label carriers between the retracted and extended positions; a pair of bearings that respectively support the pair of drive shafts on the pair of movable base portions for rotation; a third pair of elongated rectilinear slideway adjusters that support the pair of movable base portions on the main base portion for adjustment along one of the directions; and each dispensing head having an elongated slidable connection to one of the shafts to permit adjustment of the dispensing heads along the other direction, the drive mechanism driving the shuttle and the label carriers of the dispensing heads in coordination with the opening and closing of the mold sections to provide labels to the cavity sections of the mold prior to the blow molding.

10. An in-mold label dispenser for use with a plastic blow molding machine, said machine having a multiple cavity mold including mold sections movable between open and closed positions, with each mold section including at least two cavity sections such that the closed mold sections cooperatively define at least two enclosed cavities for blow molding multiple pieces, the in-mold label dispenser comprising: a base including a main base portion and a pair of movable base portions; a shuttle including a pair of dispensing heads each of which includes a pair of label carriers movable thereon between retracted and extended positions; the shuttle being movable with respect to the base between a withdrawn position with respect to the mold and an inserted position between the open mold sections; the shuttle including an adjustable support assembly having a pair of support members and a first pair of elongated rectilinear slideway adjusters for respectively mounting the pair of support members on the shuttle for adjustment along a first direction; the support assembly also having a second pair of elongated rectilinear slideway adjusters for respectively mounting the pair of dispensing heads on the pair of support members for adjustment along a second direction transverse to the first direction to thereby adjustably mount the pair of dispensing heads with respect to each other; a label supply for providing labels to the label carriers of the dispensing heads with the shuttle in the withdrawn position; a drive mechanism including a first drive having a drive linkage that extends between the base and the shuttle to drive the shuttle between the withdrawn and inserted positions; the drive linkage of the first drive having an adjustable link; the drive mechanism also including a second drive having a pair of rotatable drive shafts that drive the label carriers between the retracted and extended positions; a pair of bearings that respectively support the pair of drive shafts on the pair of movable base portions for rotation on opposite sides of the drive linkage of the first drive; a third pair of elongated rectilinear slideway adjusters that support the pair of movable base portions on the main base portion for adjustment along one of the directions; the second drive of the drive mechanism also including an adjustable drive linkage that drives the shafts; each dispensing head having an elongated slidable connection to one of the shafts to permit adjustment of the dispensing heads along the other direction; to drive the shuttle and the label carriers of the dispensing heads in coordination with the opening and closing of the mold sections to provide labels to the cavity sections of the mold prior to the blow molding for driving; and the drive mechanism having a common input that drives the first and second drives thereof in coordination with the opening and closing of the mold to drive.

* * * * *